(12) United States Patent
Toriumi et al.

(10) Patent No.: US 12,130,415 B2
(45) Date of Patent: Oct. 29, 2024

(54) IMAGING OPTICAL SYSTEM AND IMAGING DEVICE

(71) Applicants: Yuji Toriumi, Tokyo (JP); Hiroyuki Satoh, Kanagawa (JP)

(72) Inventors: Yuji Toriumi, Tokyo (JP); Hiroyuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 665 days.

(21) Appl. No.: 17/421,733

(22) PCT Filed: Feb. 19, 2020

(86) PCT No.: PCT/JP2020/006404
§ 371 (c)(1),
(2) Date: Jul. 9, 2021

(87) PCT Pub. No.: WO2020/171099
PCT Pub. Date: Aug. 27, 2020

(65) Prior Publication Data
US 2022/0099948 A1   Mar. 31, 2022

(30) Foreign Application Priority Data
Feb. 22, 2019 (JP) .................................. 2019-030497

(51) Int. Cl.
*G02B 13/00* (2006.01)
*G02B 27/10* (2006.01)
*G02B 27/00* (2006.01)

(52) U.S. Cl.
CPC ..... *G02B 13/0065* (2013.01); *G02B 13/0045* (2013.01); *G02B 27/1066* (2013.01); *G02B 27/0025* (2013.01)

(58) Field of Classification Search
CPC .............. G02B 13/002; G02B 13/0045; G02B 13/0065; G02B 13/007; G02B 13/0075;
(Continued)

(56) References Cited

U.S. PATENT DOCUMENTS

| 7,436,599 B2 * | 10/2008 | Mihara | .............. G02B 13/0045 |
| | | | 359/733 |
| 2004/0223068 A1 | 11/2004 | Kamo | |

(Continued)

FOREIGN PATENT DOCUMENTS

| CN | 102169222 A | 8/2011 |
| CN | 103703403 A | 4/2014 |

(Continued)

OTHER PUBLICATIONS

Office Action issued May 23, 2023 in Japanese Patent Application No. 2019-030497, 2 pages.

(Continued)

*Primary Examiner* — Sultan Chowdhury
(74) *Attorney, Agent, or Firm* — XSENSUS LLP (57) ABSTRACT

An imaging optical system includes a plurality of optical systems each including a plurality of optical members, a first reflection member, disposed for each one of the optical systems, configured to reflect light when the light passing through the plurality of optical members, and a variable aperture member having an opening disposed at an image sensor side when viewed from the first reflection member, the variable aperture member configured to change a size of the opening through which the light reflected from the first reflection member passes through, and at least a part of the variable aperture member is disposed at a position overlapping with an area corresponding to a first lens, disposed at the most object side in the plurality of optical members, along an optical axis direction.

18 Claims, 9 Drawing Sheets

(58) Field of Classification Search
CPC .... G02B 13/006; G02B 15/00; G02B 15/142; G02B 15/1425; G02B 15/144503; G02B 15/1455; G02B 15/1465; G02B 27/025; G02B 27/027; G02B 27/09; G02B 27/095; G02B 27/0955; G02B 27/0972; G02B 27/0977; G02B 27/0988; G02B 27/0025; G02B 27/1053; G02B 27/1066

See application file for complete search history.

(56) References Cited

U.S. PATENT DOCUMENTS

| | | |
|---|---|---|
| 2005/0088762 A1 | 4/2005 | Ohashi |
| 2006/0227415 A1 | 10/2006 | Caldwell et al. |
| 2006/0279853 A1* | 12/2006 | Morooka ....... G02B 15/144113 359/687 |
| 2008/0084615 A1* | 4/2008 | Hankawa ....... G02B 15/144113 359/683 |
| 2010/0157104 A1* | 6/2010 | Nagaoka ........ G02B 15/145129 348/E5.055 |
| 2013/0050405 A1 | 2/2013 | Masuda et al. |
| 2013/0050408 A1 | 2/2013 | Masuda et al. |
| 2013/0063754 A1 | 3/2013 | Saisho et al. |
| 2013/0242040 A1 | 9/2013 | Masuda et al. |
| 2014/0071226 A1 | 3/2014 | Satoh et al. |
| 2014/0132709 A1 | 5/2014 | Satoh et al. |
| 2015/0015664 A1* | 1/2015 | Masuda ................. G03B 37/04 359/725 |
| 2015/0015766 A1 | 1/2015 | Satoh et al. |
| 2015/0062363 A1 | 3/2015 | Takenaka et al. |
| 2015/0192762 A1 | 7/2015 | Satoh et al. |
| 2015/0301316 A1 | 10/2015 | Masuda et al. |
| 2016/0147045 A1 | 5/2016 | Masuda et al. |
| 2016/0266359 A1 | 9/2016 | Amano et al. |
| 2016/0313541 A1 | 10/2016 | Satoh et al. |
| 2016/0337584 A1 | 11/2016 | Masuda et al. |
| 2016/0353020 A1 | 12/2016 | Satoh |
| 2017/0310895 A1 | 10/2017 | Masuda et al. |
| 2017/0315336 A1 | 11/2017 | Masuda et al. |
| 2018/0024333 A1 | 1/2018 | Satoh et al. |
| 2018/0213152 A1 | 7/2018 | Masuda et al. |
| 2019/0086649 A1 | 3/2019 | Satoh et al. |
| 2019/0243110 A1 | 8/2019 | Masuda et al. |
| 2019/0273848 A1 | 9/2019 | Satoh |
| 2019/0293900 A1 | 9/2019 | Toriumi et al. |
| 2019/0293913 A1 | 9/2019 | Toriumi et al. |
| 2020/0014908 A1 | 1/2020 | Ebe |

FOREIGN PATENT DOCUMENTS

| | | |
|---|---|---|
| CN | 104808314 A | 7/2015 |
| CN | 106291887 A | 1/2017 |
| CN | 106990509 A | 7/2017 |
| CN | 107505693 A | 12/2017 |
| EP | 1 788 419 A1 | 5/2007 |
| JP | 2004-056257 A | 2/2004 |
| JP | 2006-154705 A | 6/2006 |
| JP | 2009-063838 A | 3/2009 |
| JP | 2009-181131 A | 8/2009 |
| JP | 2013-218278 A | 10/2013 |
| JP | 2014-056048 | 3/2014 |
| JP | 2018-136488 A | 8/2018 |
| JP | 2018-163363 A | 10/2018 |
| JP | 2020-008629 A | 1/2020 |
| WO | WO2013/015431 A1 | 1/2013 |

OTHER PUBLICATIONS

Intention to Grant issued Apr. 18, 2023 in European Patent Application No. 20 709 750.2, 36 pages. (with text intended for grant).

Office Action issued Oct. 3, 2023 in Japanese Patent Application No. 2019-030497, 4 pages.

Office Action issued Jul. 1, 2022 in Chinese Patent Application No. 202080014910.9, 8 pages.

Office Action issued Jul. 26, 2023 in Chinese Patent Application No. 202080014910.9, 7 pages.

Office Action issued Dec. 20, 2022 in Japanese Patent Application No. 2019-030497, 4 pages.

International Search Report issued on May 13, 2020 in PCT/JP2020/006404 filed on Feb. 19, 2020, 8 pages.

* cited by examiner

IMAGING OPTICAL SYSTEM AND IMAGING DEVICE

CROSS-REFERENCE TO RELATED APPLICATIONS

The present application is based on PCT filing PCT/JP2020/006404, filed Feb. 19, 2020, which claims priority to Japanese Patent Application 2019-030497, filed Feb. 22, 2019, the entire contents of each are incorporated herein by reference.

TECHNICAL FIELD

This disclosure relates to an imaging optical system and an imaging device.

BACKGROUND

Patent Literatures 1 and 2 describe imaging systems, capable of capturing full-view spherical images, which include two imaging units, each is configured as a combination of a wide-angle lens having an angle of view greater than 180 degrees and an image sensor used for capturing images using the wide-angle lens, and images captured by the two imaging units are synthesized to obtain an image having a stereoscopic angle of 4a radians.

CITATION LIST

Patent Literature

PTL 1: JP-2014-056048-A
PTL 2: JP-6019970-B

SUMMARY OF INVENTION

Technical Problem

In conventional imaging systems described in the patent literatures 1 and 2, to adjust the light amount while designing the imaging systems compact in size, for example, a shutter speed of a mechanical shutter and an electronic shutter, and international organization for standardization (ISO) sensitivity can be changed.

However, the above described light amount adjusting method has a drawback. For example, when a setting range of the light amount is adjusted for capturing images in a dark scene, the light amount becomes the limit of the setting range when capturing images in a bright scene, with which an image may have a white area due to saturation of the light amount. On the other hand, when a setting range of the light amount is adjusted for capturing images in a bright scene, the light amount becomes the limit of the setting range when capturing images in a dark scene, with which an image may have a dark area.

In view of the above described issue, instead of disposing the mechanical shutter and the electronic shutter, a physical variable aperture (variable aperture stop) can be disposed on an optical path. However, in a smaller and complicated structure of conventional imaging systems described in the patent literatures 1 and 2, where and how to dispose the variable aperture for satisfying a demand for compact in size becomes a technical or design issue.

This disclosure describes an embodiment that is devised in view of the above described issue, in which an imaging optical system and an imaging device that can effectively adjust the light amount while achieving compact in size can be provided.

Solution to Problem

In one aspect of the present invention, an imaging optical system includes a plurality of optical systems each including a plurality of optical members, a first reflection member, disposed for each one of the optical systems, configured to reflect light when the light passing through the plurality of optical members, and a variable aperture member having an opening disposed at an image sensor side when viewed from the first reflection member, the variable aperture member configured to change a size of the opening through which the light reflected from the first reflection member passes through, and at least a part of the variable aperture member is disposed at a position overlapping with an area corresponding to a first lens, disposed at the most object side in the plurality of optical members, along an optical axis direction.

In another aspect of the present invention, an imaging device includes a plurality of optical systems each including a plurality of optical members, a plurality of image sensors, each disposed for the respective optical systems, configured to generate an image of an object captured by the respective optical systems, a reflection member, disposed for each one of the optical systems, configured to reflect light when the light passing through the plurality of optical members, and a variable aperture member having an opening disposed at an image sensor side when viewed from the reflection member, the variable aperture member configured to change a size of the opening through which the light reflected from the reflection member passes through, and at least a part of the variable aperture member is disposed at a position overlapping with an area corresponding to a first lens, disposed at the most object side in the plurality of optical members, along an optical axis direction.

Advantageous Effects of Invention

As to the embodiment of this disclosure, an imaging optical system and an imaging device that can effectively adjust the light amount while achieving compact in size can be provided.

DESCRIPTION OF EMBODIMENTS

Hereinafter, a description is given of an imaging device 1 (or imaging optical system) according to an embodiment with reference to FIGS. 1 to 7. In this description, directions in front, rear, upper, bottom, left and right correspond to arrow directions described in each drawing.

Figure 1A:
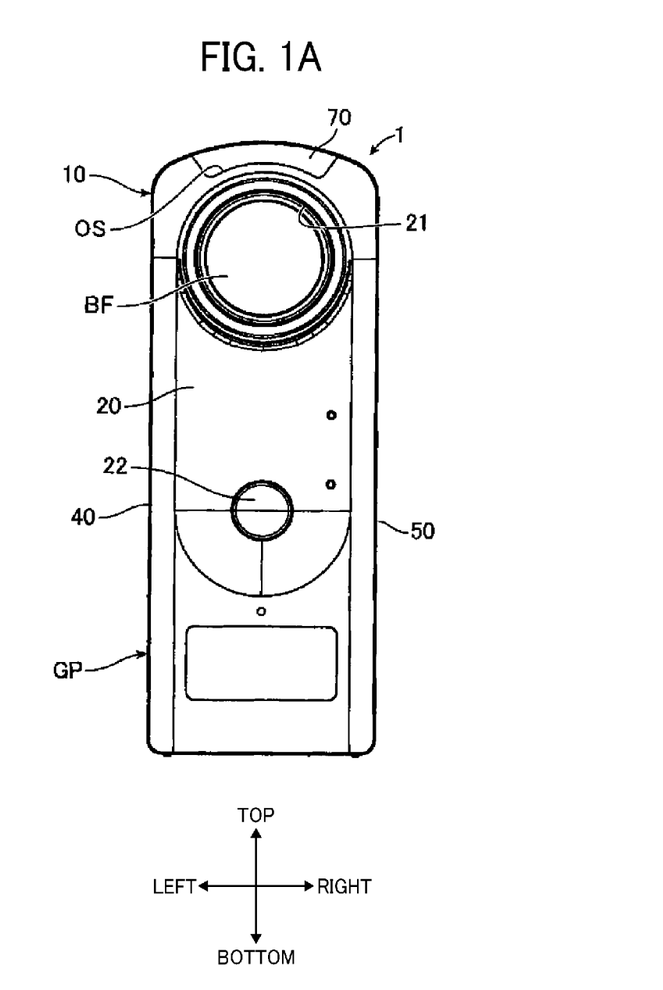
FIGS. 1A, 1B and 1C illustrate an external configuration of an imaging device according to an embodiment.
Figure 1B:
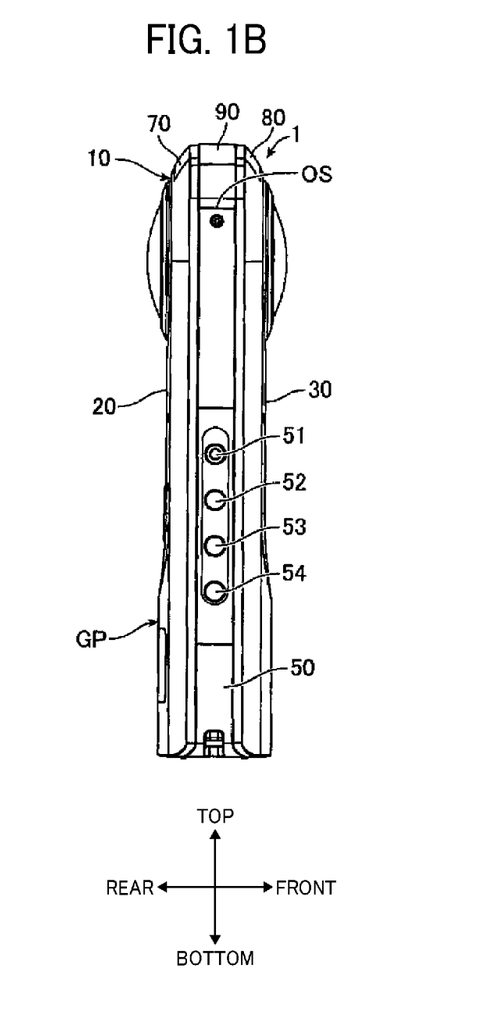
Figure 1C:
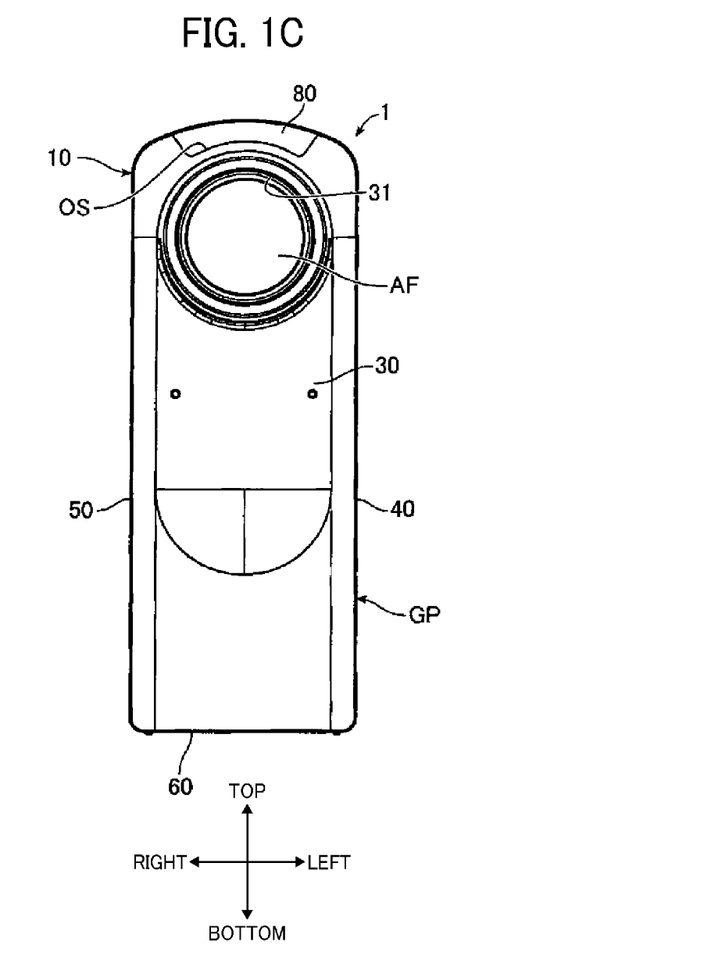

As illustrated in six-sided views of FIGS. 1A, 1B, and 1C, the imaging device 1 includes, for example, a casing 10, in which each of components of the imaging device 1 is assembled and held inside or outside the casing 10. For example, the casing 10 has a contour, which is short along the left-to-right direction, long along the top-to-bottom direction, having a given thickness along the front-to-rear direction, and a given rounded profile at a top side.

The casing 10 includes, for example, a rear-side metal casing 20 and a front-side metal casing 30. The rear-side metal casing 20 and the front-side metal casing 30 can be formed as a composite molded casing composed of a relatively higher rigidity metal material (e.g., magnesium alloy) compared to a rear-side resin casing 70, a front-side resin casing 80, and a connection resin casing 90 to be described later.

The rear-side metal casing 20 and the front-side metal casing 30 are connected by a left-side connection casing 40, a right-side connection casing 50, and a bottom-side connection casing 60. The left-side connection casing 40, the right-side connection casing 50 and the bottom-side connection casing 60 can be made of, for example, the same metal material as the rear-side metal casing 20 and the front-side metal casing 30, but there is a degree of freedom in the material and various design changes can be made as needed.

A positioning boss is formed in any one of the rear-side metal casing 20 and the front-side metal casing 30, and a boss insertion hole is formed on the other one of the rear-side metal casing 20 and the front-side metal casing 30, so that the rear-side metal casing 20 and the front-side metal casing 30 are positioned at close proximity when the positioning boss is inserted into the boss insertion hole. Further, each of the rear-side metal casing 20 and the front-side metal casing 30 includes screw holes at the left-side face, the right-side face, and the bottom face, which overlap with each other when the positioning boss is inserted into the boss insertion hole (positioning state). Further, the left-side connection casing 40, the right-side connection casing 50, and the bottom-side connection casing 60 are fitted into a gap between the rear-side metal casing 20 and the front-side metal casing 30, and then common screws are screwed (tightened) into the respective screw holes, with which the rear-side metal casing 20, the front-side metal casing 30, the left-side connection casing 40, the right-side connection casing 50 and the bottom-side connection casing 60 are integrated as one casing.

Further, the configuration of integrating the rear-side metal casing 20, the front-side metal casing 30, the left-side connection casing 40, the right-side connection casing 50 and the bottom-side connection casing 60 has a given degree of freedom, and various design changes can be made as needed.

Further, as illustrated in FIGS. 1A and 1C, a lens exposure hole 21 having a circular shape is formed at a upper portion of the rear-side metal casing 20, and a lens exposure hole 31 having a circular shape is formed at a upper portion of the front-side metal casing 30.

Further, as illustrated in FIG. 1A, a shutter button 22 serving as a trigger for initiating an image capturing operation (i.e., still image capturing, movie image capturing) is provided slightly below a middle portion in the top-to-bottom direction of the rear-side metal casing 20.

As illustrated in FIG. 1B, a power button 51 is provided at a middle portion in the top-to-bottom direction of the right-side connection casing 50 to switch on and off the power supply of the imaging device 1, and operation buttons 52, 53 and 54 are provided below the power button 51 to perform setting operations, such as an image capturing mode and a wireless connection mode.

As illustrated in FIGS. 1A, 1B and 1C, when the rear-side metal casing 20, the front-side metal casing 30, the left-side connection casing 40, the right-side connection casing 50, and the bottom-side connection casing 60 are integrated as the one casing, a portion below the middle in the top-to-bottom direction of the one casing is used as a grip portion GP. A user can press the shutter button 22, the power button 51, and the operation buttons 52 to 54 while holding the grip portion GP.

As illustrated in FIGS. 1A, 1B and 1C, when the rear-side metal casing 20, the front-side metal casing 30, the left-side connection casing 40, the right-side connection casing 50, and the bottom-side connection casing 60 are integrated as the one casing, an opening OS that is open to the top side is formed. The opening OS is covered by the rear-side resin casing 70, the front-side resin casing 80, and the connection resin casing 90. The detail structure of the rear-side resin casing 70, the front-side resin casing 80 and the connection resin casing 90 (e.g., connection with a structure connecting the rear-side metal casing 20, the front-side metal casing 30, the left-side connection casing 40, the right-side connection casing 50, and the bottom-side connection casing 60) has a given degree of freedom, and various design changes can be made as needed.

Figure 2:
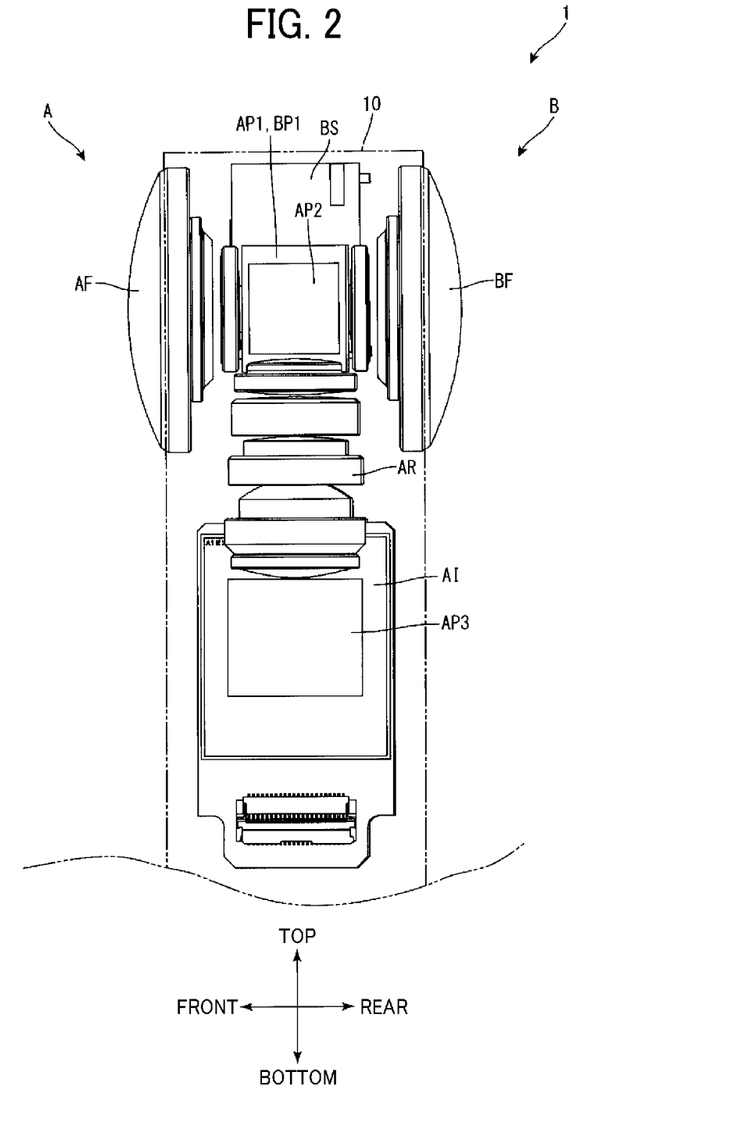
FIG. 2 illustrates a wide-angle lens system and an image sensor disposed inside a casing viewed from a left side.
Figure 3:
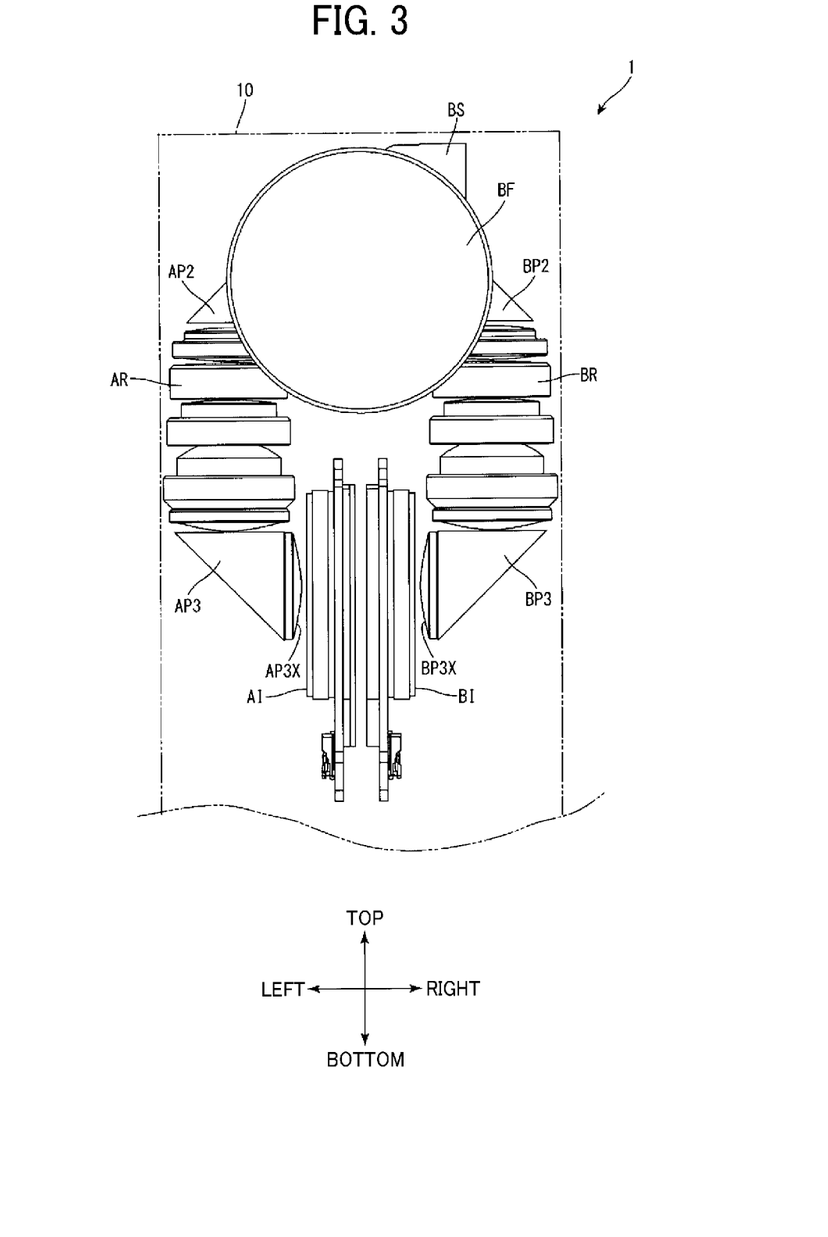
FIG. 3 illustrates a wide angle lens system and an image sensor disposed inside a casing viewed from a rear side.
Figure 4:
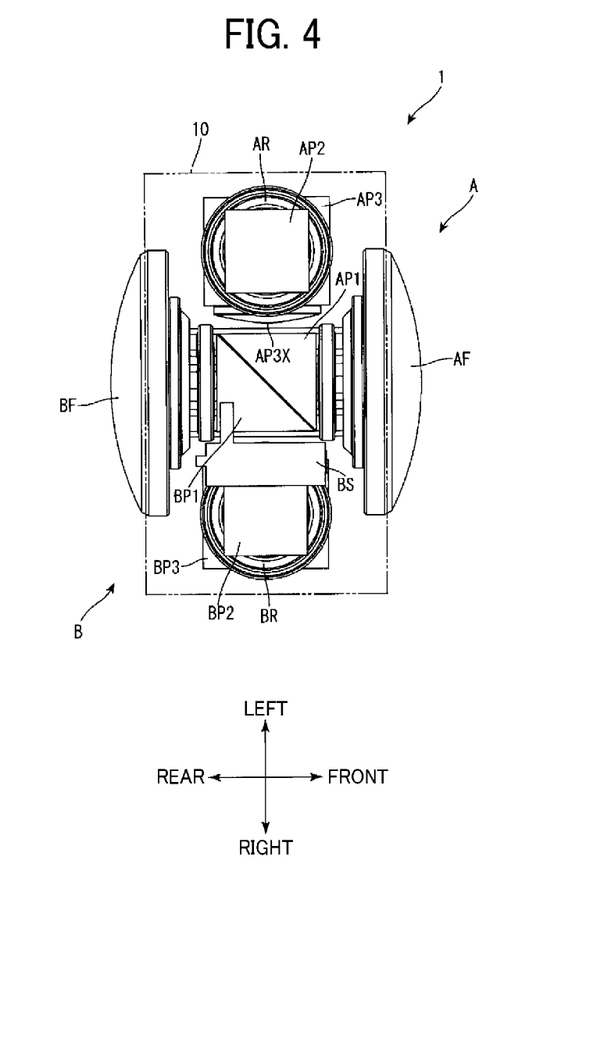
FIG. 4 illustrates a wide angle lens system and an image sensor disposed inside a casing viewed from a top side.

As illustrated in FIGS. 2 to 4, the imaging device 1 includes or houses two wide-angle lens systems A and B (optical systems), and two image sensors AI and BI inside the casing 10. The two wide-angle lens systems A and B are arranged symmetrically with each other inside the casing 10, and images captured by the two wide-angle lens systems A and B are respectively focused and generated on the two image sensors AI and BI. In FIGS. 2 to 4, the casing 10 is schematically drawn with a virtual line (two-point dashed line). The two wide-angle lens systems A and B can be configured using the same design specification, and the image sensors AI and BI can be configured using the same design specification. For example, each of the wide-angle lens systems A and B have an angle of view greater than 180 degrees. The imaging device 1 can be used as an imaging device capable of capturing full-view spherical images by synthesizing two images generated by the image sensors AI and BI as an image having a stereoscopic angle of 4a radians.

As illustrated in FIGS. 2 to 4, the wide-angle lens system A includes, for example, a negative front group AF, a first prism AP1 (reflection member, first reflection member), a variable aperture member AS (variable aperture stop), a second prism AP2 (second reflection member), a positive rear group AR, and a third prism AP3 (third reflection member) in the order from the object side to the image sensor.

The negative front group AF has a function of capturing light ray corresponding to an angle of view greater than 180 degrees, and the positive rear group AR has a function of correcting aberration of the focused image. The variable aperture member AS is omitted in FIG. 2 to FIG. 4 while illustrated in FIG. 5. Further, the detailed configuration and arrangement of the variable aperture member AS will be described later with reference to FIGS. 6 and 7.

When light flux coming from an object (hereinafter, object light flux) enters the negative front group AF, the negative front group AF emits the object light flux from the exit side of the negative front group AF while dispersing the object light flux. Then, the first prism AP1 reflects the object light flux, incident from the negative front group AF, by 90 degrees to the left direction. Then, the aperture AS adjusts a passing amount of the object light flux reflected by the first prism AP1 (light amount adjustment). Then, the second prism AP2 reflects the object light flux having the light amount adjusted by the aperture AS by 90 degrees to the downward direction. Then, the positive rear group AR emits the object light flux, reflected by the second prism AP2, to the downward direction while converging the object light flux. Then, the third prism AP3 reflects the object light flux, incident from the positive rear group AR, by 90 degrees to the right direction to focus and generate an image on an imaging plane of the image sensor AI.

As illustrated in FIG. 3, a convex portion AP3X is formed on an exit face of the third prism AP3 while projecting toward the imaging plane of the image sensor AI.

Figure 5:
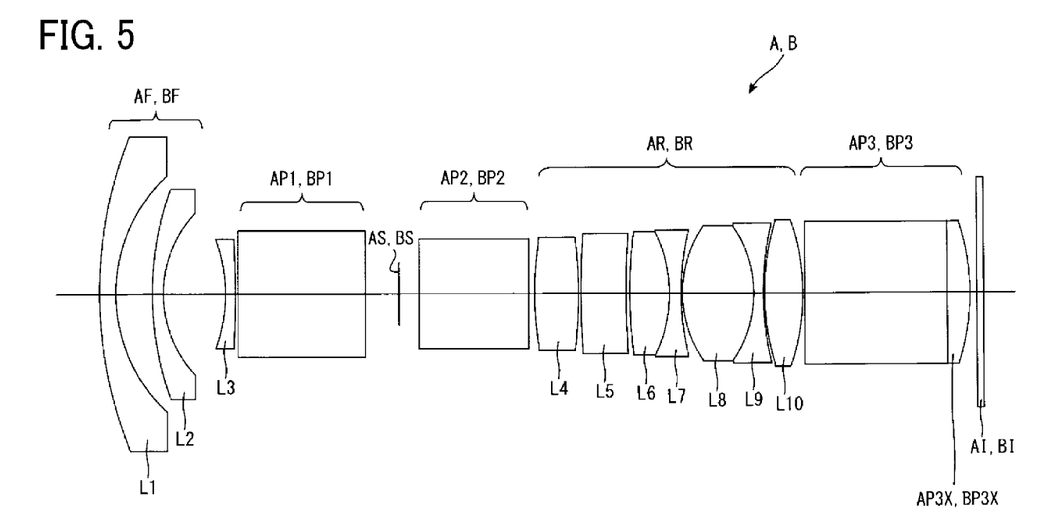
FIG. 5 illustrates a detailed configuration of a wide-angle lens system and an image sensor disposed inside a casing.

As illustrated in FIG. 5, each of the negative front group AF and the positive rear group AR consists of a plurality of lenses, and the plurality of lenses is represented as AF and AR in FIGS. 2 to 4.

As illustrated in FIGS. 2 to 4, the wide-angle lens system B includes, for example, a negative front group BF, a first prism BP1 (reflection member, first reflection member), a variable aperture member BS (variable aperture stop), a second prism BP2 (second reflection member), a positive rear group BR, and a third prism BP 3 (third reflection member) in the order from the object side to the image sensor. The negative front group BF has a function of capturing light ray corresponding to an angle of view greater than 180 degrees, and the positive rear group BR has a function of correcting aberration of the focused image. Further, the detailed configuration and arrangement of the variable aperture member BS will be described later with reference to FIGS. 6 and 7.

When light flux coming from an object (hereinafter, object light flux) enters the negative front group BF, the negative front group BF emits the object light flux from the exit side of the negative front group BF while dispersing the object light flux. Then, the first prism BP1 reflects the object light flux, incident from the negative front group BF by 90 degrees to the right direction. Then, the aperture BS adjusts a passing amount of the object light flux reflected by the first prism BP1 (light amount adjustment). Then, the second prism BP2 reflects the object light flux having the light amount adjusted by the aperture BS by 90 degrees to the downward direction. Then, the positive rear group BR emits the object light flux, reflected by the second prism BP2, to the downward direction while converging the object light flux. Then, the third prism BP3 reflects the object light flux, incident from the positive rear group BR by 90 degrees to the left direction to focus and generate an image on an imaging plane of the image sensor BI.

As illustrated in FIG. 3, a convex portion BP3X is formed on an exit face of the third prism BP3 while projecting toward the imaging plane of the image sensor BI.

As illustrated in FIG. 5, each of the negative front group BF and the positive rear group BR consists of a plurality of lenses, and the plurality of lenses is represented as BF and BR in FIGS. 2 to 4.

As to the image sensors AI and BI of the wide-angle lens systems A and B disposed in the casing 10, the imaging plane of the image sensor AI faces the left direction, the imaging plane of the image sensor BI faces the right direction, and a back plane (opposite to the imaging plane) of the image sensor AI and a back plane (opposite to the imaging plane) of the image sensor BI face with each other.

FIG. 5 illustrates an example of detailed configuration of the wide angle lens systems A and B and the image sensors AI and BI. FIG. 5 illustrates the configuration without describing the actual reflection directions of the first prism AP1 to the third prism AP3, and the first prism BP1 to the third prism BP3. Accordingly, the wide-angle lens systems A and B and the image sensors AI and BI in FIG. 5 employ the same (common) configuration.

Each of the negative front group AF and BF includes, for example, a plurality of optical members, such as negative meniscus lens L1 having a convex face to the object side, a negative meniscus lens L2 having a convex face to the object side, and a biconcave negative lens L3 in the order from the object side. In this configuration, the negative meniscus lens L1 corresponds to a "first lens" disposed at the most object side of the wide-angle lens systems A and B.

Each of the positive rear groups AR and BR includes, for example, a biconvex positive lens L4, a positive meniscus lens L5 having a convex face to the object side, a biconvex positive lens L6, a biconcave negative lens L7, a biconvex positive lens L8, a biconcave negative lens L9, and a biconvex positive lens L10. The biconvex positive lens L6 and the biconcave negative lens L7 are joined together. The biconvex positive lens L8 and the biconcave negative lens L9 are joined together.

The above-described structure of the negative front groups AF and BF and the positive rear groups AR and BR is only one example, and various design changes can be made as needed to the configuration of the negative front groups AF and BF and the positive rear groups AR and BR. Further, the front groups AF and BF may have the positive power instead of negative power, and the rear groups AR and BR may have the negative power instead of the positive power.

As to the above configured imaging device 1, the negative front group AF of the wide-angle lens system A and the negative front group BF of the wide angle lens system B are disposed along the same (common) optical axis while the negative front group AF of the wide-angle lens system A and the negative front group BF of the wide angle lens system B face the opposite directions in the front-to-rear direction.

Further, the positive rear group AR, which extends in the top-to-bottom direction (vertical direction) after the light path is reflected by each of the first prism AP1 and the second prism AP2 by 90 degrees, and the positive rear group BR, which extends in the top-to-bottom direction (vertical direction) after the light path is reflected by each of the first prism BP1 and the second prism BP2 by 90 degrees are disposed in parallel to each other while spaced apart in the left-to-right direction (horizontal direction). Further, the image sensor AI disposed at a position after the light path is reflected by the third prism AP3 by 90 degrees and the image sensor BI disposed at a position after the light path is reflected by the third prism BP3 by 90 degrees are disposed in the casing 10 while the imaging plane of the image sensor AI faces the left direction, the imaging plane of the image sensor BI faces the right direction, and a back plane (opposite to the imaging plane) of the image sensor AI and a back plane (opposite to the imaging plane) of the image sensor BI face with each other.

As to the imaging device 1, the lens disposed at the most object side of the negative front group AF of the wide-angle lens system A is projected or exposed forward from the lens exposure hole 31 of the front-side metal casing 30, and the lens disposed at the most object side of the negative front group BF of the wide-angle lens system B is projected or exposed rearward from the lens exposure hole 21 of the rear-side metal casing 20 while other components are accommodated inside the casing 10.

That is, each of the wide-angle lens systems A and B includes the front groups AF and BF, respectively, in the opposite positions in the front-to-rear direction at the upper portion in the casing 10, and the rear groups AR and BR extending in parallel from the upper portion to the lower portion in the casing 10.

Further, each of the wide angle lens systems A and B includes, for example, the prisms (reflection members), such as the first prisms AP1 and BP1 (first reflection member), each changes the optical path of the object light flux that has passed through the front groups AF and BF into the left-to-right direction at the upper portion of the casing 10, the second prisms AP2 and BP2 (second reflection member), each changes the optical path of the object light flux that has passed through the first prisms AP1 and BP1 into the top-to-bottom direction at the upper portion of the casing 10, and the third prisms AP3 and BP3 (third reflection member), each changes the optical path of the object light flux that has passed through the rear groups AR and BR into the left-to-right direction at the lower portion of the casing 10. With this configuration, the respective components configuring the imaging device 1 can be arranged with a higher layout efficiency, and thereby the imaging device 1 can be designed in compact in size.

Further, each of the first prism AP1 of the wide-angle lens system A and the first prism BP1 of the wide-angle lens system B share one reflection face, common to the wide-angle lens systems A and B. That is, the first prism AP1 and the first prism BP1 set a diagonal face of the first prism AP1 and a diagonal face of the first prism BP1 close to each other to share the reflection face. The reflection face of the wide-angle lens systems A and B consists of a reflective film common to the wide-angle lens systems A and B, and the reflecting film is sandwiched between the diagonal face of the first prism AP1 and the diagonal face of the first prism BP1, which are optically equivalent two transparent members. In this state, the first prism AP1 and the first prism BP1 and the reflective film are integrated to form the reflection face common to the wide-angle lens systems A and B. With this configuration, the width of the wide-angle lens systems A and B in the incident optical axis direction can be reduced. Alternatively, the reflection face of the first prism AP1 of the wide-angle lens system A and the reflection face of the first prism BP1 of the wide-angle lens system B may be spaced apart from each other with a slight clearance.

As illustrated in FIG. 3, the third prism AP3 of the wide-angle lens system A includes the convex portion AP3X (aspherical face) projecting toward the imaging plane of the image sensor AI, and the third prism BP 3 of the wide-angle lens system B includes the convex portion BP3X (aspherical face) projecting toward the imaging plane of the image sensor BI. Since the wide-angle lens systems A and B have a short focal length, when the last faces of the wide-angle lens system A and B are curved, the back focus becomes longer even when the focal length is short. In order to avoid this issue, the convex portions AP3X and BP3X are provided to change the exit positions.

The wide-angle lens systems A and B and the image sensors AI and BI configured as described above are integrated or blocked as an optical unit. Screw holes are formed on the optical unit. When the optical unit is housed in the connected structure of the rear-side metal casing 20, the front-side metal casing 30, the left-side connection casing 40, the right-side connection casing 50, and the bottom-side connection casing 60, and then common screws are inserted and screwed (tightened) into the screw holes, the optical unit is accommodated within the connected structure of the rear-side metal casing 20, the front-side metal casing 30, the left-side connection casing 40, the right-side connection casing 50, and the bottom-side connection casing 60.

Figure 6:
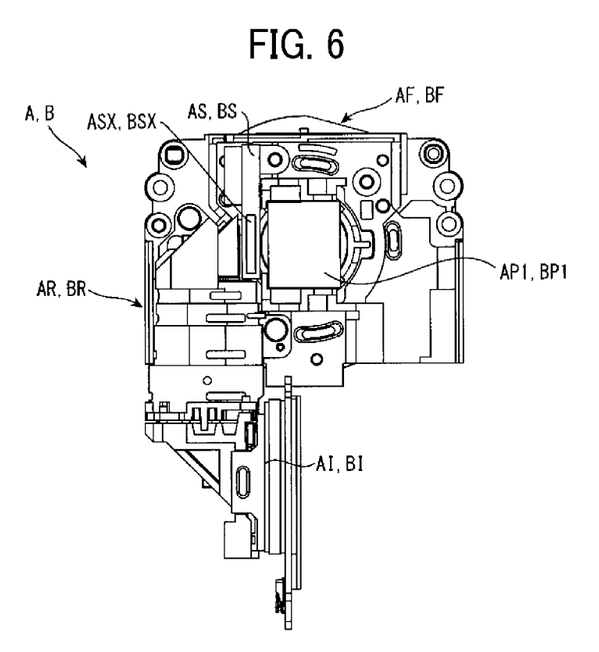
FIG. 6 is a first view illustrating a configuration and arrangement of a variable aperture member.
Figure 7:
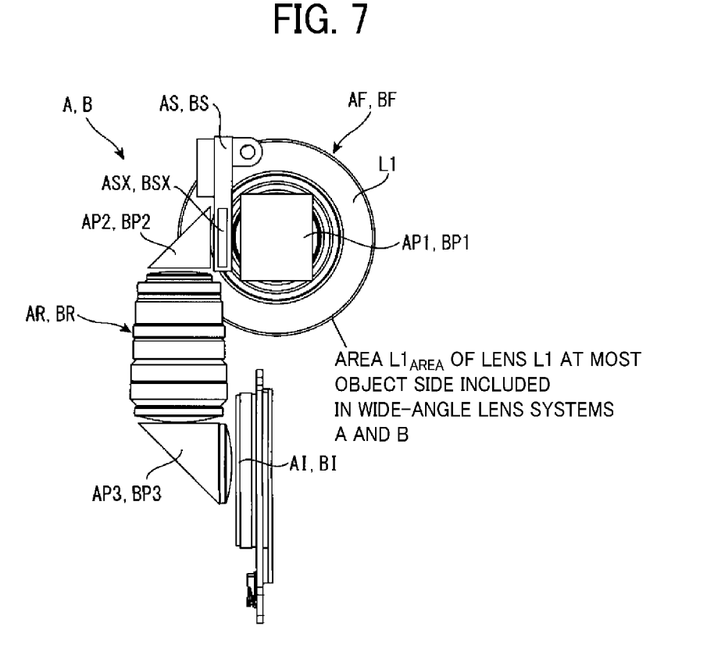
FIG. 7 is a second view illustrating a configuration and arrangement of the variable aperture member, removing some parts from FIG. 6.

Hereinafter, a description is given of a detailed configuration and arrangement of the variable aperture members AS and BS with reference to FIGS. 6 and 7. FIGS. 6 and 7 are first and second diagrams illustrating the configuration and arrangement of the variable aperture members AS and BS. FIG. 7 (second diagram) is illustrated by omitting the components of the optical unit, such as a lens holding cylinder and a prism holding member, from FIG. 6 (first diagram).

In FIGS. 6 and 7, the reference symbols are assigned as the wide angle lens systems A and B, the front groups AF and BF, the first prisms AP1 and BP1 (first reflection member), the variable apertures member AS and BS (variable aperture stop), the second prisms AP2 and BP2 (second reflection member), the rear groups AR and BR, the third prisms AP3 and BP3 (third reflection member), and the image sensors AI and BI, which are arranged symmetrically with each other.

The imaging optical system of the embodiment includes the wide-angle lens systems A and B as "a plurality of optical systems," and the image sensors AI and BI as "a plurality of image sensors" to generate images captured by the two wide-angle lens systems A and B.

The imaging optical system of the embodiment includes the first prisms AP1 and BP1 as the "first reflection member" that reflects the light that enters the wide-angle lens systems A and B, the second prisms AP2 and BP2 as the "second reflection member" that reflects the light reflected by the first prisms AP1 and BP1, and the third prisms AP3 and BP3 as the "third reflection member" that reflects the light reflected by the second prisms AP2 and BP2.

The imaging optical system of the embodiment includes the variable aperture members AS and BS capable of changing the aperture size, in which the light reflected by the first prisms AP1 and BP1 passes through. As illustrated in FIG. 7, the variable aperture members AS and BS have openings ASX and BSX, respectively.

The size of the openings ASX and BSX of the variable aperture members AS and BS can be independently adjusted in accordance with signals output from the image sensor AI and the image sensor BI, respectively. For example, when an imaging system employing the imaging device 1 is used outdoors, a larger amount of sun light enters only one of the wide-angle lens systems A and B, in which the brightness (exposure state) of the wide-angle lens system A and B may become greatly different. If the image captured by the image sensor AI and the image captured by the image sensor BI are synthesized in this state, the boundary between a bright area and a dark area is formed clearly, and thereby full-view spherical images become unnatural images. Therefore, in a case when the larger amount of sun light enters only one of the wide-angle lens systems A and B, an aperture size of the variable aperture member of one wide-angle lens system receiving the larger amount of sun light is set smaller than an aperture size of the variable aperture member of other wide-angle lens system to adjust the brightness (exposure state) of the wide-angle lens systems A and B at a uniform level, with which full-view spherical images not having the boundary of the bright area and the dark area can be obtained.

Other than the above described functions, the variable aperture members AS and BS have following optical functions. For example, the variable aperture members AS and BS can be used to reduce the aberration. Further, the variable aperture members AS and BS can be used to set the deeper focal depth.

Further, since the automatic exposure (AE) has some limitation, the variable aperture members AS and BS can be used effectively when the image capturing scene has a greater brightness difference. Further, the variable aperture members AS and BS can be used to adjust the amount of ambient light.

The variable aperture members AS and BS are disposed at the image sensor side when viewed from the first prisms AP1 and BP1. More specifically, the variable aperture member AS is disposed between the first prism AP and the second prism AP2, and the variable aperture member BS is disposed between the first prism BP1 and the second prism BP2. Further, a symmetric configuration setting the variable aperture members AS and BS as the center can be devised as illustrated in FIG. 5. Specifically, the first prism AP1 and the second prism AP2 are disposed at both sides of the variable aperture member AS, the first prism BP1 and the second prism BP2 are disposed at both sides of the variable aperture member BS, the negative front group AF is disposed at the incident side of the first prisms AP1, the positive rear group AR is disposed at the exit side of the second prism AP2, the negative front group BF is disposed at the incident side of the first prisms BP1, and the positive rear group BR is disposed at the exit side of the second prism BP2.

Hereinafter, a case of disposing the variable aperture member at the object side when viewed from the first prism is assumed. In this case, since the length in the front group in the wide-angle lens system becomes longer, the thickness of the imaging device 1 increases (i.e., the length along the front-to-rear direction of the imaging device 1 increases).

Further, another case of disposing the variable aperture member at the image sensor side when viewed from the second prism is assumed. In this another case, since the length of the variable aperture member is added to the length of the rear group in the wide-angle lens system, the height of the imaging device 1 increases (i.e., the length along the top-to-bottom direction of the imaging device 1 increases).

By contrast, when the variable aperture member AS is disposed between the first prism AP1 and the second prism AP2 and the variable aperture member BS is disposed between the first prism BP1 and the second prism BP2 as above described (see FIG. 5), the width of the imaging device 1 (i.e., the length along the left-to-right direction of the imaging device 1) is not affected. This is because the width of the imaging device 1 (i.e., the length along the left-to-right direction of the imaging device 1) is defined by the distance between the image sensors AI and BI that are spaced apart along the left-to-right direction of the imaging device 1.

Further, the light reflected by the first prisms AP1 and BP1 and the light reflected by the third prisms AP3 and BP3 travel in the opposite directions with each other (one direction in the left-to-right direction and the other direction in the left-to-right direction). Further, the light reflected by the first prisms AP1 and BP1 and the light reflected by the third prisms AP3 and BP3 overlap with each other when viewed from the top-to-bottom direction (vertical direction) of the imaging device 1. With this configuration, the width of the imaging device 1 (i.e., the length along the left-to-right direction of the imaging device 1) can be reduced.

FIGS. 6 and 7 are views when viewed from the direction of the optical path of the light before reflecting by the first prisms AP1 and BP1 (i.e., the front-to-rear direction of the imaging device 1) and/or when viewed from a plane perpendicular to the optical path of the light before reflecting by the first prisms AP1 and BP1 (i.e., plane including the vertical direction and the horizontal direction).

As illustrated in FIG. 7, an area $L1_{AREA}$ of the lens L1 (first lens), disposed at the most object side in each of the wide-angle lens system A and B, is defined. Specifically, the area $L1_{AREA}$ can be defined using a circular contour that is an outer peripheral edge of the first lens L1.

As illustrated in FIGS. 6 and 7, the most part of the variable aperture members AS and BS are disposed within the area $L1_{AREA}$ while a part of upper portion of the variable aperture members AS and BS are disposed outside the area $L1_{AREA}$ (e.g., deviating or protruding from the area $L1_{AREA}$). Further, the entire of the variable aperture members AS and BS can be disposed within the area $L1_{AREA}$. That is, it is suffice if at least a part of the variable aperture members AS and BS are disposed within the area $L1_{AREA}$.

The entirety of the openings ASX and BSX of the variable aperture members AS and BS can be disposed within the area $L1_{AREA}$ However, as to the openings ASX and BSX of the variable aperture members AS and BS, a part of the openings ASX and BSX can be disposed within the area $L1_{AREA}$, and the remaining part of the openings ASX and BSX can be disposed outside the area $L1_{AREA}$. That is, it is suffice if at least a part of the opening ASX of the variable aperture member AS and a part of the opening BSX of the variable aperture member BS are disposed within the area $L1_{AREA}$.

As above described, when viewed from the direction of the optical path of the light before reflecting by the first prisms AP1 and BP1 (i.e., the front-to-rear direction of the imaging device 1) and/or when viewed from the plane perpendicular to the optical path of the light before reflecting by the first prisms AP1 and BP1 (i.e., plane including the vertical direction and the horizontal direction), at least a part of the variable aperture members AS and BS, or a part or entire of the openings ASX and BSX of the variable aperture members AS and BS are disposed within the area $L1_{AREA}$.

Further, at least a part of the variable aperture members AS and BS, or a part or entire of the openings ASX and BSX of the variable aperture members AS and BS are disposed at a position overlapping with the first lens L1, disposed at the most object side in each of the wide-angle lens systems A and B, along the optical axis direction. In this configuration, the "optical axis direction" can be construed as, for example, the optical axis direction of the first lens L1, the optical axis direction of the front groups AF and BF including the first lens L1, the optical axis direction of the light before reflecting by the first prisms AP1 and BP1, or the direction orthogonal to a sheet face of FIGS. 6 and 7.

As to the imaging device 1 that can capture full-view spherical images, a configuration that can reduce the size of device by setting a shorter distance between the front and rear sides (i.e., smaller thickness in the front-to-rear direction) has been demanded. Further, the adjustment of the light amount captured at the front and rear sides of the imaging device 1 is also demanded to prevent the full-view spherical images from becoming unnatural images having a white area and a dark area.

In the embodiment, the variable aperture members AS and BS, which can change the aperture size in the respective optical paths of the wide-angle lens systems A and B, are disposed. By controlling the variable aperture members AS and BS, the light amount captured at the front and rear sides of the imaging device 1 (the front-side metal casing 30 and the rear-side metal casing 20 of the imaging device 1) can be adjusted to prevent the full-view spherical images from becoming unnatural images having a white area and a dark area.

Further, in the embodiment, the area $L1_{AREA}$ of the first lens L1 disposed at the most object side in each of the wide-angle lens systems A and B is used as a reference area, in which at least a part of the variable aperture members AS and BS, or a part or entire of the openings ASX and BSX of the variable aperture members AS and BS are disposed within the area $L1_{AREA}$, with which the imaging device 1 can be designed in compact in size.

Further, at least a part of the variable aperture members AS and BS, or a part or entire of the openings ASX and BSX of the variable aperture members AS and BS are disposed at the position overlapping with the first lens L1, disposed at the most object side in each of the wide-angle lens systems A and B, along the optical axis direction.

That is, the area $L1_{AREA}$ of the first lens L1 disposed at the most object side in each of the wide-angle lens systems A and B has some area that is not used for the optical system, which means some of the area $L1_{AREA}$ of the first lens L1 becomes a dead space for the imaging device 1, in which a space in the front side of the first lens L1 and a space in the rear side of the first lens L1 are referred to as an offset area. In the embodiment, the area $L1_{AREA}$, which includes at least some area as the dead space, can be utilized by arranging the variable aperture members AS and BS within the area $L1_{AREA}$, with which the imaging device 1 can be designed in compact in size, and thereby full-view spherical images having natural and higher quality can be obtained without making the size of the imaging device 1 greater. If the imaging device 1 can be designed in compact in size (i.e., the size of the imaging device 1 does not become greater), the demand of setting a shorter distance between the front and rear sides of the imaging device 1 (i.e., smaller thickness in the front-to-rear direction of the imaging device 1) can be achieved, and the imaging device 1 can be further designed in compact in size along the vertical direction and the horizontal direction.

In the above described embodiment, the imaging device 1 includes the two wide-angle lens systems A and B, but the number of wide-angle lens systems mounted on the imaging device 1 is not limited to two, but can be three or more. In this case, the number of image sensors mounted on the imaging device 1 can be set equal to the number of wide-angle lens systems.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein.

This patent application is based on and claims priority pursuant to Japanese Patent Application No. 2019-030497, filed on Feb. 22, 2019, in the Japan Patent Office, the entire disclosure of which is hereby incorporated by reference herein.

REFERENCE SIGNS LIST

1 Imaging device (imaging optical system)
10 Casing
20 Rear-side metal casing
21 Lens exposure hole
22 Shutter button
30 Front-side metal casing
31 Lens exposure hole
40 Left-side connection casing
50 Right-side connection casing
51 Power button
52 53 54 Operation button
60 Bottom-side connection casing
70 Rear-side resin casing
80 Front-side resin casing
90 Connection resin casing
GP Grip portion
OS Opening
A Wide-angle lens system (optical system, a plurality of optical systems)
AF Front group
AR Rear Group
AS Variable aperture member (variable aperture stop)
ASX Opening (aperture size)
AP1 First prism (reflection member, first reflection member)
AP2 Second prism (second reflection member)
AP3 Third prism (third reflection member)
AP3X Convex portion
AI Image sensor
B Wide-angle lens system (optical system, a plurality of optical systems)
BF Front group
BR Rear Group
BS Variable aperture member (variable aperture stop)
BSX Opening (aperture size)
BP1 First prism (reflection member, first reflection member)
BP2 Second prism (second reflection member)
BP3 Third prism (third reflection member)
BP3X Convex portion
BI Image sensor
L1 Negative lens (first lens)
L2 Negative lens
L3 Negative lens
L4 Positive lens
L5 Positive lens
L6 Positive lens
L7 Negative lens
L8 Positive lens
L9 Negative lens
L10 Positive lens

The invention claimed is:

1. An imaging optical system comprising:
a plurality of optical systems each including a plurality of optical elements;
a first reflector, disposed for each one of the optical systems, to reflect light when the light passing through the plurality of optical elements;
a variable aperture having an opening disposed at an image sensor side when viewed from the first reflector, the variable aperture to change a size of the opening through which the light reflected from the first reflector passes through, and at least a part of the variable aperture is disposed at a position overlapping with an area corresponding to a first lens, disposed at the most object side in the plurality of optical elements, along an optical axis direction; and
a second reflector disposed at a position in an exit side direction of the first reflector, the second reflector to reflect the light reflected by the first reflector, wherein the variable aperture is disposed between the first reflector and the second reflector.

2. The imaging optical system according to claim 1, wherein at least a part of the opening of the variable aperture is disposed at the position overlapping with the area corresponding to the first lens, disposed at the most object side in the plurality of optical elements, along the optical axis direction.

3. The imaging optical system according to claim 1, wherein an entire of the opening of the variable aperture is disposed at the position overlapping with the area corresponding to the first lens, disposed at the most object side in the plurality of optical elements, along the optical axis direction.

4. The imaging optical system according to claim 1, wherein when viewed from a direction of an optical path of light before being reflected by the first reflector or a plane perpendicular to the optical path of the light before being reflected by the first reflector, at least a part of the variable aperture or a part or entire of the opening of the variable aperture is disposed at the position overlapping with the area corresponding to the first lens, disposed at the most object side in the plurality of optical elements, along the optical axis direction.

5. The imaging optical system according to claim 1, further comprising:
a third reflector disposed at a position in an exit side direction of the second reflector, the third reflector to reflect the light reflected by the second reflector,
wherein the light reflected by the first reflector and the light reflected by the third reflector travel in opposite directions.

6. The imaging optical system according to claim 1, wherein:
the plurality of optical systems include a negative front lens group, and
the negative front lens group includes negative meniscus lens which is the first lens.

7. The imaging optical system according to claim 6, wherein:
incoming light passes through exactly three lenses before reflecting off of the first reflector.

8. The imaging optical system according to claim 6, wherein:
the plurality of optical systems include a positive rear lens group which receives light which has passed through the negative front lens group, the first reflector, the variable aperture, and the second reflector, in this order.

9. The imaging optical system according to claim 8, further comprising:
a third reflector disposed at a position which is at an exit side direction of the second reflector, the third reflector to reflect the light reflected by the second reflector.

10. An imaging device comprising:
a plurality of optical systems each including a plurality of optical elements;
a plurality of image sensors, each disposed for the respective optical systems, to generate an image of an object captured by the respective optical systems;
a first reflector disposed for each one of the optical systems, the reflector to reflect light when the light passing through the plurality of optical elements;
a variable aperture having an opening disposed at an image sensor side when viewed from the reflector, the variable aperture to change a size of the opening through which the light reflected from the reflector passes through, and at least a part of the variable aperture is disposed at a position overlapping with an area corresponding to a first lens, disposed at the most object side in the plurality of optical elements, along an optical axis direction; and
a second reflector disposed at a position in an exit side direction of the first reflector, the second reflector to reflect the light reflected by the first reflector, wherein the variable aperture is disposed between the first reflector and the second reflector.

11. The imaging device according to claim 10, wherein at least a part of the opening of the variable aperture is disposed at the position overlapping with the area corresponding to the first lens, disposed at the most object side in the plurality of optical elements, along the optical axis direction.

12. The imaging device according to claim 10, wherein an entire of the opening of the variable aperture is disposed at the position overlapping with the area corresponding to the first lens, disposed at the most object side in the plurality of optical elements, along the optical axis direction.

13. The imaging device according to claim 10, wherein when viewed from a direction of an optical path of light before being reflected by the first reflector or a plane perpendicular to the optical path of the light before being reflected by the first reflector, at least a part of the variable aperture or a part or entire of the opening of the variable aperture is disposed at the position overlapping with the area corresponding to the first lens, disposed at the most object side in the plurality of optical elements, along the optical axis direction.

14. The imaging device according to claim 10, further comprising:
a third reflector disposed at a position in an exit side direction of the second reflector, the third reflector to reflect the light reflected by the second reflector,
wherein the light reflected by the first reflector and the light reflected by the third reflector travel in opposite directions.

15. The imaging device according to claim 10, wherein:
the plurality of optical systems include a negative front lens group, and
the negative front lens group includes negative meniscus lens which is the first lens.

16. The imaging device according to claim 15, wherein:
incoming light passes through exactly three lenses before reflecting off of the first reflector.

17. The imaging device according to claim 15, wherein:
the plurality of optical systems include a positive rear lens group which receives light which has passed through the negative front lens group, the first reflector, the variable aperture, and the second reflector, in this order.

18. The imaging device according to claim 17, further comprising:
a third reflector disposed at a position which is at an exit side direction of the second reflector, the third reflector to reflect the light reflected by the second reflector.

* * * * *